(12) United States Patent
Bellagamba et al.

(10) Patent No.: US 8,711,859 B2
(45) Date of Patent: Apr. 29, 2014

(54) INTERCONNECTING VIRTUAL DOMAINS

(75) Inventors: Patrice Bellagamba, Saint Raphael (FR); Victor M. Moreno, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 284 days.

(21) Appl. No.: 12/956,027

(22) Filed: Nov. 30, 2010

(65) Prior Publication Data

US 2012/0134358 A1 May 31, 2012

(51) Int. Cl.
*H04L 12/56* (2011.01)

(52) U.S. Cl.
USPC .......................................................... 370/392

(58) Field of Classification Search
USPC ................................................. 370/389, 392
See application file for complete search history.

(56) References Cited

U.S. PATENT DOCUMENTS

2008/0247346 A1* 10/2008 Gulbani et al. ............... 370/310
2011/0032843 A1* 2/2011 Papp et al. .................... 370/254

OTHER PUBLICATIONS

Kulmala, Marko, et al., "*ASBR VRF context for BGP/MPLS IP VPN*" draft-kulmala-l3vpn-interas-option-d-02.txt, L3VPN Working Group, Internet Draft, 15 pages, Feb. 6, 2006.
"*MPLS VPN—Inter-AS Option AB*", Cisco Systems, Inc., 48 pages, Dec. 17, 2007.
U.S. Appl. No. 12/590,656 entitled "*Compressed Virtual Routing and Forwarding in a Communications Network*", inventors Victor Moreno, et al., 32 pages including specification, claims, abstract, and drawings, filed Nov. 12, 2009.

* cited by examiner

*Primary Examiner* — Dang Ton
*Assistant Examiner* — Kevin Lee
(74) *Attorney, Agent, or Firm* — Baker Botts L.L.P.

(57) ABSTRACT

According to certain embodiments, control packets are received through a control plane tunnel that communicates control traffic for virtual private networks (VPNs) among autonomous systems. A routing instance of each control packet is identified according to a control tag of the control packet. At least two routing instances are distinct from each other. The control packets are routed according to the routing instances. According to certain embodiments, data packets are received through a data plane tunnel that communicates data traffic for the VPNs among the autonomous systems. A forwarding instance of the control packet is identified for each data packet according to a data tag of the data packet. At least two forwarding instances are distinct from each other. The data packets are forwarded according to the forwarding instances.

17 Claims, 4 Drawing Sheets

INTERCONNECTING VIRTUAL DOMAINS

TECHNICAL FIELD

The present disclosure relates generally to communication systems.

BACKGROUND

A virtual private network (VPN) is a network that uses public communication networks, such as the Internet, to provide secure access to the network. A VPN may encapsulate data communicated over a public network to keep the data private. In certain situations, a VPN may communicate data between two autonomous systems.

DESCRIPTION OF EXAMPLE EMBODIMENTS

Overview

According to certain embodiments, control packets are received through a control plane tunnel that communicates control traffic for virtual private networks (VPNs) among autonomous systems. A routing instance of each control packet is identified according to a control tag of the control packet. At least two routing instances are distinct from each other. The control packets are routed according to the routing instances. According to certain embodiments, data packets are received through a data plane tunnel that communicates data traffic for the VPNs among the autonomous systems. A forwarding instance of the control packet is identified for each data packet according to a data tag of the data packet. At least two forwarding instances are distinct from each other. The data packets are forwarded according to the forwarding instances.

Description

Figure 1:
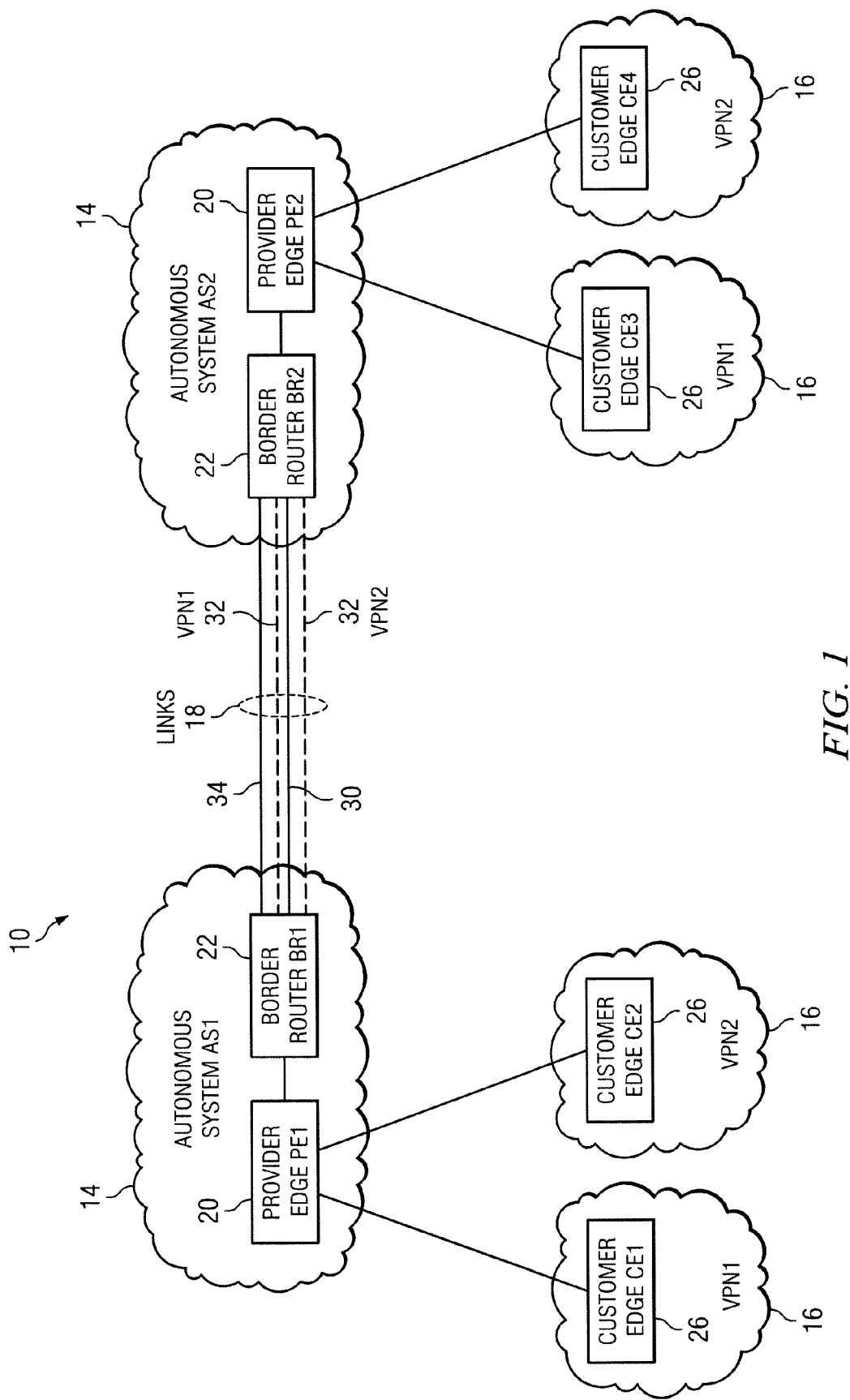
FIG. 1 illustrates an example of a system for routing and forwarding packets.

FIG. 1 illustrates an example of a system 10 for routing and forwarding packets. In the illustrated example, system 10 includes autonomous systems (ASs) 14 (such as AS1 and AS2) and virtual private networks (VPNs) 16 (such as VPN1 and VPN2) coupled by links 18 as shown. Autonomous systems 14 include provider edge routers (PEs) 20 (such as PE1 and PE2) and autonomous system boundary routers (AS-BRs), or boundary routers (BRs), 22 (such as BR1 and BR2). Virtual private networks 16 include customer edge routers (CEs) 26 (such as CE1 through CE4). Links 18 include a control plane tunnel 30 and data links 32 or a data plane tunnel 34.

In certain embodiments, system 10 may allow a link 18 to carry traffic for more than one VPN 16. Tags may be used to distinguish traffic from different VPNs. In example terminology, the traffic may be "compressed." In certain embodiments, system 10 may allow VPNs 16 to communicate over autonomous systems 14 using any suitable communications protocols.

An autonomous system 14 may include any suitable communication network. In certain embodiments, autonomous system 14 may include an Option A or B network as described in RFC 4364, Section 10 "Multi-AS Backbones." An autonomous system 14 may use any suitable data switching technique, such as Multiprotocol Label Switching (MPLS), IP-VPN, and/or VPN routing and forwarding (VRF) techniques (for example, VRF-lite, compressed-VRF, or other suitable VRF techniques). Certain embodiments may be applied to autonomous systems 14 that are connected by a tunnel over one or more transit autonomous systems 14. A tunnel (such as a control plane tunnel) may allow connectivity over the transit autonomous systems 14 without impacting the transit autonomous systems 14.

In certain embodiments, a VPN 16 may connect autonomous systems 14 to provide VPN services, and may comprise any suitable virtual private network, for example, a virtualized data center. VPN 16 may use any suitable virtualization technique, such as 802.1q, virtual local area network (VLAN), or Overlay Transport Virtualization (OTV). In certain embodiments, VPN 16 may have a VPN routing and forwarding (VRF) instance that may provide node routing isolation. For example, VPN1 has VRF1, and VPN2 has VRF2. In certain embodiments, the data switching technique of VPN 16 might not be compatible with the data switching technique of autonomous system 14 coupled to VPN 16.

Boundary router 22 routes traffic between autonomous system 14 and other communication networks over any suitable number of links 18. A link 18 may correspond to an interface, such as a VLAN interface. A link 18 may be physical or logical. Physical links may be used to connect two nodes. Examples of physical links include Packet over SONET or Ethernet links. Logical links may be used to connect nodes over zero, one, two, or more hops. A logical link may be a tunnel that can carry a tag. Examples of tunnels include OTV overlay or Ethernet/IP tunnels.

In the example, links 18 may include control plane tunnel 30 and data links 32 (such as VRF1 and VRF2) or links 18 may include control plane tunnel 30 and data plane tunnel 34. Control plane tunnel 30 communicates control plane traffic. Control plane tunnel 30 may correspond to a routing protocol session of any suitable routing or reachability protocol, such as Border Gateway Protocol (BGP) or Multiprotocol Border Gateway Protocol (MP-BGP). Data links 32 or data plane tunnel 34 communicates data plane traffic. Data plane tunnel 34 may correspond to a virtual link such as a Overlay Transport Virtualization (OTV), Layer 2 Tunneling Protocol (L2TP) v3, Virtual Concatenation (VC), or Ethernet over Multiprotocol Label Switching Pseudowire (EoMPLS PW) link. A virtual link may be established between topologically adjacent autonomous systems 14 or across one or more transit autonomous systems 14.

In certain embodiments, one link 18 may be used to carry more than one VRF instance, and tags may be used to distinguish the instances. In example terminology, the traffic may be "compressed." For example, one link 18 may communicate traffic for VRF instances VRF1 and VRF2, and may be used to distribute labeled VPN prefixes between boundary routers 22 to label the traffic flows between boundary routers 22. In certain embodiments, boundary routers 22 associate a subinterface with a VRF instance and a routing protocol session that carries traffic for the VPN of the VRF instance. Any suitable tag may be used, for example, a virtualization tag. A virtualization tag may be used to virtualize a network, and may include an 802.1q, VLAN, or OTV tag.

The routing protocol session may communicate any suitable traffic, such as control plane traffic and/or data plane traffic. In example terminology, control plane traffic and/or data plane traffic may be "compressed." In certain embodiments, the control plane may be compressed, and the data plane may be segmented using 802.1q, VLAN, or OTV. In certain embodiments, both the control plane and the data plane may be compressed.

In certain embodiments, a provider edge router 20 communicates traffic to and from customer edge routers 26. In certain embodiments, a provider edge router 20 treats an adjacent provider edge router 20 as a customer edge router 26. In certain embodiments, Layer 3 MPLS VPN mechanisms or other mechanisms such as VRF-lite, Multi-Topology Routing, Compressed VRFs, and VNETs may be used for route redistribution. Provider edge routers 20 may use external BGP (eBGP) to distribute unlabeled IP addresses to each other. Routing between provider edge routers 20 and customer edge routers 26 may be performed in any suitable manner. In certain embodiments, 802.1q may be used for the data plane, and MP-BGP may be used for the control plane.

Figure 2:
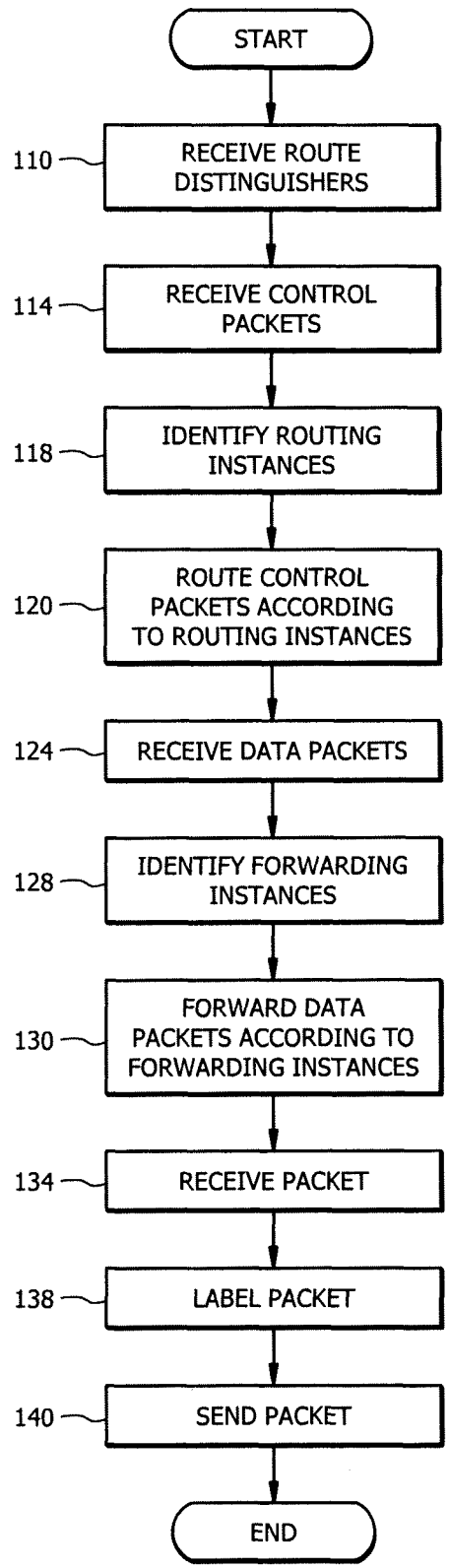
FIG. 2 illustrates an example of a method for routing and forwarding packets.

FIG. 2 illustrates an example of a method for routing and forwarding packets. The method may be performed by any suitable component, such as border router 22. The method starts at step 110, where route distinguishers are received. Route distinguishers identify VPNs 16 defined over autonomous systems 14. For example, a first route distinguisher identifies a first VPN, and a second route distinguisher identifies a second VPN. The first VPN and the second VPN may have the same IP prefix, but the first route distinguisher is distinct from the second route distinguisher. The component performing the method may map each route distinguisher to the VPN 16 that the route distinguisher identifies. A route distinguisher may be used as a tag of a packet to identify the VPN to which the packet belongs.

Control packets are received from another autonomous system 14 at step 114. The control packets may be received through control plane tunnel 30 that communicates control traffic for VPNs 16 and may each have a control tag. In certain embodiments, the control tag may be the route distinguisher of the VPN to which the packet belongs. A routing instance is identified for each control packet according to a control tag of the control packet at step 118. In certain embodiments, the control tag identifies the VPN to which the packet belongs, and the VRF instance of the VPN is determined to be the routing instance. The control packets are routed according to the routing instances as step 120. In certain embodiments, the control packets are routed to the VLAN IF corresponding to the VRF instance.

Data packets are received from another autonomous system 14 at step 124. The data packets may be received through data plane tunnel 34 that communicates data traffic for VPNs 16 and may each have a data tag. In certain embodiments, the data tag may be the route distinguisher of the VPN to which the packet belongs. A forwarding instance is identified for each data packet according to a data tag of the data packet at step 128. In certain embodiments, the data tag identifies the VPN to which the packet belongs, and the VRF instance of the VPN is determined to be the forwarding instance. The data packets are forwarded according to the forwarding instances as step 130. In certain embodiments, the data packets are forwarded to the VLAN IF corresponding to the VRF instance.

A next packet is received from a VPN 16 of own autonomous system 14 at step 134. The next packet may be a control or data packet. The next packet is labeled with a route distinguisher corresponding to the VPN 16 at step 138. The next packet is sent through a tunnel 18 at step 140. A control packet may be sent through control plane tunnel 30, and a data packet may be sent to data plane tunnel 34. The method then ends.

Figure 3:
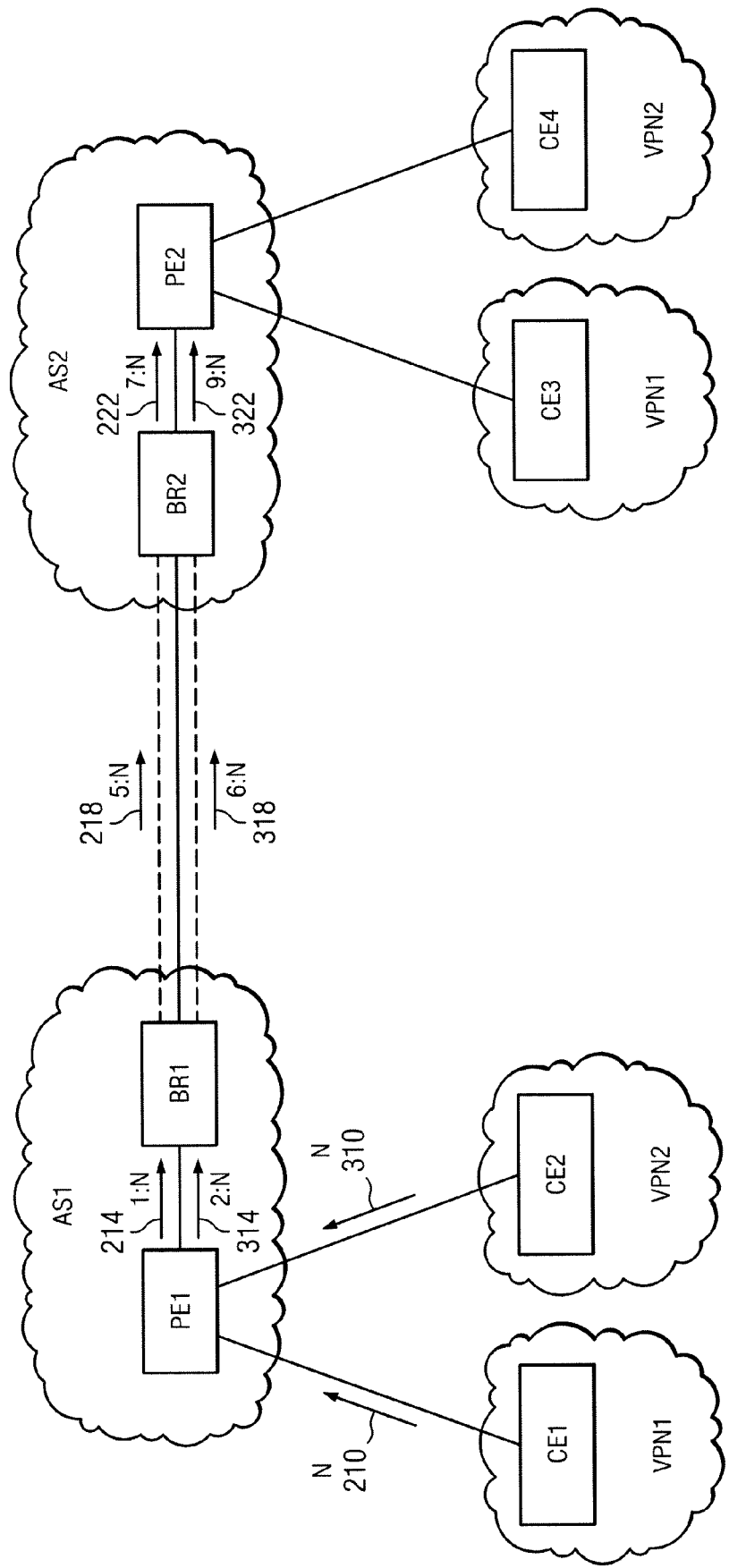
FIG. 3 illustrates an example of a method for advertising route distinguishers.

FIG. 3 illustrates an example of a method for advertising route distinguishers. A route distinguisher RD is an identifier attached to a route that identifies which VPN belongs to each route. Each routing instance may have a unique RD autonomous system 14 associated with it. The RD is used to place a boundary around a VPN, so that the same IP address prefixes can be used in different VPNs without having these IP address prefixes overlap. In the example, PE1 uses RD 1 for VRF 1 and RD 2 for VRF 2. PE2 uses RD 3 for VRF 1 and RD 4 for VRF 2. BR1 has VRF 1 provisioned with RD 5 and VRF 2 provisioned with RD 6. BR2 has VRF 1 provisioned with RD 7 and VRF 2 provisioned with RD 8.

The method starts at step 210, where CE1 advertises a prefix N, which indicates the IP address of VPN1, to PE1. PE1 advertises VPN prefix RD 1:N to BR1 at step 214. BR1 maps prefix RD 1:N and prefix RD 5:N for VPN 1. BR1 advertises prefix RD 5:N to BR2 at step 218. BR1 may advertise the route with a route distinguisher that may or may not be the same as the route distinguisher received from PE1. For example, if the same route distinguisher is used, prefix RD 1:N may be equivalent to prefix RD 5:N. If a different route distinguisher is used, prefix RD 1:N may be different from prefix RD 5:N. BR1 sets itself as the next hop for prefix RD 5:N. In certain embodiments, BR1 allocates a local label that is signaled with prefix RD 5:N.

BR2 maps prefix RD 5:N and RD 7:N for VPN 1. Similarly as above, BR2 may advertise the route with a route distinguisher that may or may not be the same as the route distinguisher received from BR1. BR2 sets the next hop of prefix RD 7:N to the BR1 interface IP address in VRF 1. The next hop table ID is also set to VRF 1. If traffic between BR1 and BR2 is IP, an outgoing label is not installed in the forwarding entry for RD 7:N.

BR2 advertises prefix RD 7:N to PE2 at step 222. BR2 sets itself as the next hop for prefix RD 7:N. In certain embodiments, BR1 allocates a local label that is signaled with prefix RD 7:N. PE2 and maps prefix RD 7:N and RD 3:N for VRF 1.

CE2 advertises a prefix N to PE1 at step 310. Prefix N indicates the IP address of VPN2. PE1 advertises VPN prefix RD 2:N to BR1 at step 314. BR1 maps prefix RD 2:N and prefix RD 6:N for VPN 2. BR1 advertises prefix RD 6:N to BR2 at step 318. BR1 may advertise the route with a route distinguisher that may or may not be the same as the route distinguisher received from PE1. BR1 sets itself as the next hop for prefix RD 6:N. In certain embodiments, BR1 allocates a local label that is signaled with prefix RD 6:N.

BR2 maps prefix RD 6:N and prefix RD 8:N as VPN 2. Similarly as above, BR2 may advertise the route with a route distinguisher that may or may not be the same as the route distinguisher received from BR1. BR2 sets the next hop of prefix RD 8:N to the BR1 interface IP address in VRF 2. The next hop table ID is also set to VRF 2. If traffic between BR1 and BR2 is to be IP, an outgoing label is not installed in the forwarding entry for RD 8:N.

BR2 advertises prefix RD 9:N to PE2 at step 322. BR2 sets itself as the next hop for prefix RD 9:N. In certain embodiments, BR1 allocates a local label that is signaled with prefix RD 9:N. PE2 maps prefix RD 9:N and prefix RD 4:N as VRF 2. The method then ends.

Figure 4:
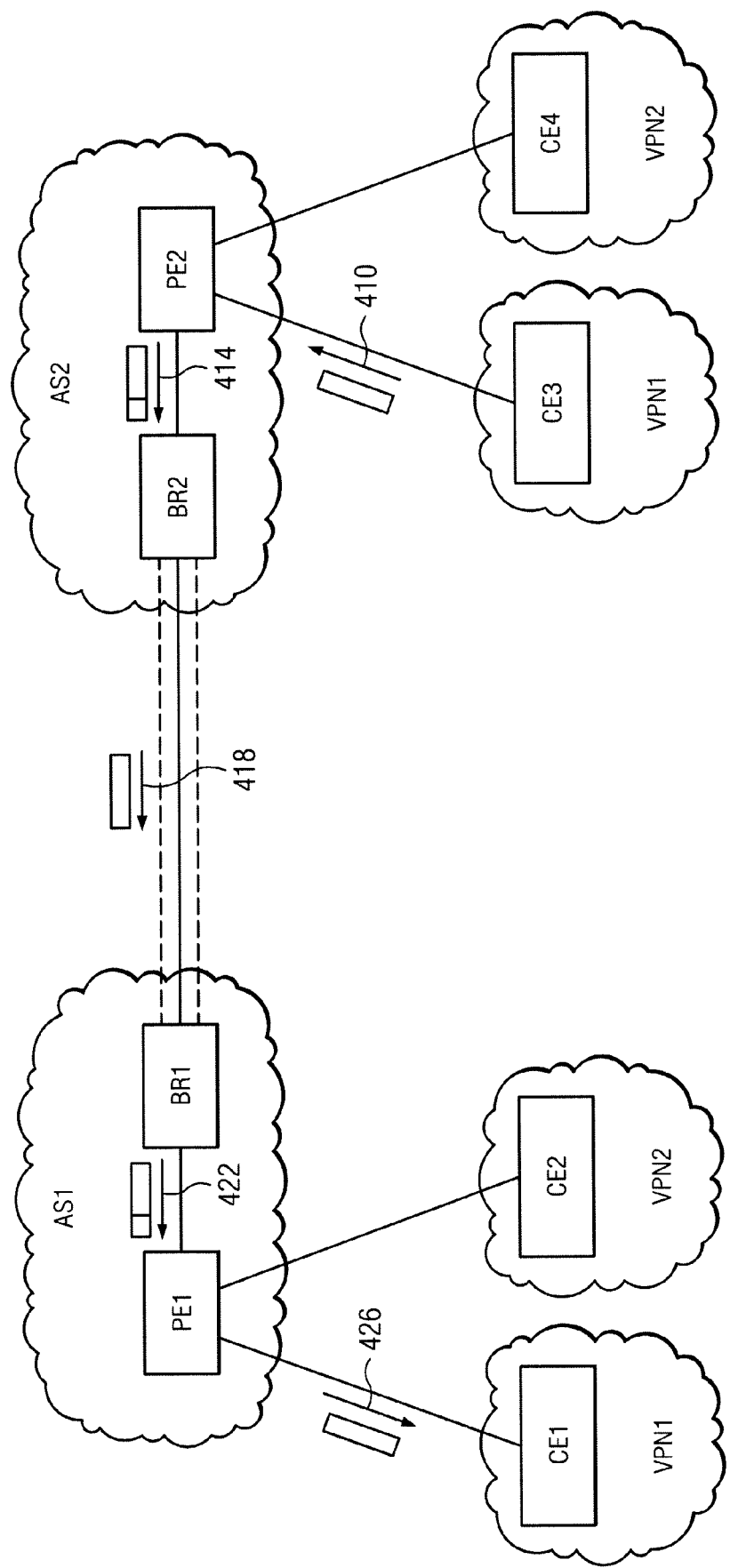
FIG. 4 illustrates an example of a method for processing packets using route distinguishers.

FIG. 4 illustrates an example of a method for processing packets using route distinguishers. The method starts at step 410, where CE3 sends a packet destined for VPN1 (indicated by address N) to PE2. In certain embodiments, PE2 determines from N that the packet is destined for VPN1 and tags the packet with RD 7:N. PE2 may encapsulate the packet with a tunneling label (such as an Interior Gateway Protocol (IGP) label) to tunnel the packet to BR2.

PE2 sends the packet to BR2 at step 414. In certain embodiments, BR2 determines from RD 7:N that the packet is destined for VPN1 and tags the packet with RD 5:N. BR2 sends the packet to BR1 over link 18 at step 418. If the packet, data plane tunnel 34 is used.

BR1 determines from RD 5:N that the packet is destined for VPN1 and tags the packet with RD 1:N. BR1 may also encapsulate the packet with a tunneling label to tunnel the packet to PE 1. BR1 sends the packet to PE1 at step 422. PE1 removes the VPN label and forwards the IP packet to CE1 at step 426. The method then ends.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of boundary routers 22 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses disclosed may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   receiving a plurality of control packets through a control plane tunnel that communicates control traffic for a plurality of virtual private networks (VPNs) among a plurality of autonomous systems;
   for each control packet, identifying a routing instance of the control packet according to a control tag of the control packet to yield a plurality of routing instances, at least two routing instances distinct from each other;
   routing the control packets according to the routing instances;
   receiving a plurality of data packets through a data plane tunnel that communicates data traffic for the VPNs among the autonomous systems, the data plane tunnel being separate from the control plane tunnel in a single link;
   for each data packet, identifying a forwarding instance of the data packet for the data packet according to a data tag of the data packet to yield a plurality of forwarding instances, at least two forwarding instances distinct from each other; and
   forwarding the data packets according to the forwarding instances, wherein the single link carries the routing instance and the forwarding instance and the control tag identifies the routing instance and the data tag identifies the forwarding instance.

2. The method of claim 1, further comprising:
   receiving a plurality of route distinguishers, each route distinguisher identifying a VPN; and
   mapping each route distinguisher to the VPN that the each route distinguisher identifies.

3. The method of claim 1, further comprising:
   receiving a plurality of route distinguishers, a first route distinguisher identifying a first VPN, a second route distinguisher identifying a second VPN, the first VPN and the second VPN having the same IP prefix, the first route distinguisher distinct from the second route distinguisher; and
   mapping each route distinguisher to the VPN that the each route distinguisher identifies.

4. The method of claim 1, further comprising:
   receiving a next control packet for a VPN;
   labeling the next control packet with a route distinguisher corresponding to the VPN; and
   sending the next control packet through the control plane tunnel.

5. The method of claim 1, further comprising:
   receiving a next data packet for a VPN;
   labeling the next data packet with a route distinguisher corresponding to the VPN; and
   sending the next data packet through the data plane tunnel.

6. The method of claim 1, at least two autonomous systems of the plurality of autonomous systems being connected by the control plane tunnel over one or more transit autonomous systems.

7. An apparatus comprising:
an interface configured to:
receive a plurality of control packets through a control plane tunnel that communicates control traffic for a plurality of virtual private networks (VPNs) among a plurality of autonomous systems; and
receive a plurality of data packets through a data plane tunnel that communicates data traffic for the VPNs among the autonomous systems, the data plane tunnel being separate from the control plane tunnel in a single link; and
one or more processors configured to:
for each control packet, identify a routing instance of the control packet according to a control tag of the control packet to yield a plurality of routing instances, at least two routing instances distinct from each other;
route the control packets according to the routing instances;
for each data packet, identify a forwarding instance of the data packet for the data packet according to a data tag of the data packet to yield a plurality of forwarding instances, at least two forwarding instances distinct from each other; and
forward the data packets according to the forwarding instances, wherein the single link carries the routing instance and the forwarding instance and the control tag identifies the routing instance and the data tag identifies the forwarding instance.

8. The apparatus of claim 7, the one or more processors further configured to:
receive a plurality of route distinguishers, each route distinguisher identifying a VPN; and
map each route distinguisher to the VPN that the each route distinguisher identifies.

9. The apparatus of claim 7, the one or more processors further configured to:
receive a plurality of route distinguishers, a first route distinguisher identifying a first VPN, a second route distinguisher identifying a second VPN, the first VPN and the second VPN having the same IP prefix, the first route distinguisher distinct from the second route distinguisher; and
map each route distinguisher to the VPN that the each route distinguisher identifies.

10. The apparatus of claim 7, the one or more processors further configured to:
receive a next control packet for a VPN;
label the next control packet with a route distinguisher corresponding to the VPN; and
send the next control packet through the control plane tunnel.

11. The apparatus of claim 7, the one or more processors further configured to:
receive a next data packet for a VPN;
label the next data packet with a route distinguisher corresponding to the VPN; and
send the next data packet through the data plane tunnel.

12. The apparatus of claim 7, at least two autonomous systems of the plurality of autonomous systems being connected by the control plane tunnel over one or more transit autonomous systems.

13. One or more non-transitory computer readable media when executed by a computer are configured to:
receive a plurality of control packets through a control plane tunnel that communicates control traffic for a plurality of virtual private networks (VPNs) among a plurality of autonomous systems; and
for each control packet, identify a routing instance of the control packet according to a control tag of the control packet to yield a plurality of routing instances, at least two routing instances distinct from each other;
route the control packets according to the routing instances;
receive a plurality of data packets through a data plane tunnel that communicates data traffic for the VPNs among the autonomous systems, the data plane tunnel being separate from the control plane tunnel in a single link;
for each data packet, identify a forwarding instance of the data packet for a data packet according to a data tag of the data packet to yield a plurality of forwarding instances, at least two forwarding instances distinct from each other; and
forward the data packets according to the forwarding instances, wherein the single link carries the routing instance and the forwarding instance and the control tag identifies the routing instance and the data tag identifies the forwarding instance.

14. The media of claim 13, further configured to:
receive a plurality of route distinguishers, each route distinguisher identifying a VPN; and
map each route distinguisher to the VPN that the each route distinguisher identifies.

15. The media of claim 13, further configured to:
receive a plurality of route distinguishers, a first route distinguisher identifying a first VPN, a second route distinguisher identifying a second VPN, the first VPN and the second VPN having the same IP prefix, the first route distinguisher distinct from the second route distinguisher; and
map each route distinguisher to the VPN that the each route distinguisher identifies.

16. The media of claim 13, further configured to:
receive a next control packet for a VPN;
label the next control packet with a route distinguisher corresponding to the VPN; and
send the next control packet through the control plane tunnel.

17. The media of claim 13, further configured to:
receive a next data packet for a VPN;
label the next data packet with a route distinguisher corresponding to the VPN; and
send the next data packet through the data plane tunnel.

* * * * *